US012681854B2

(12) United States Patent
Das et al.

(10) Patent No.: US 12,681,854 B2
(45) Date of Patent: Jul. 14, 2026

(54) SYSTEM AND METHOD FOR COST AND CARBON AWARE LARGE LANGUAGE MODEL CACHE MANAGEMENT

(71) Applicant: Accenture Global Solutions Limited, Dublin (IE)

(72) Inventors: Kaushik Amar Das, Guwahati (IN); Sankar Narayan Das, Barrackpore (IN); Kuntal Dey, Birbhum (IN); Samdyuti Suri, Faridabad (IN); Vikrant Kaulgud, Bangalore (IN); Teresa Sheausan Tung, Los Angeles, CA (US); Adam Patten Burden, Tampa, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/981,136

(22) Filed: Dec. 13, 2024

(65) Prior Publication Data

US 2026/0169916 A1      Jun. 18, 2026

(51) Int. Cl.
G06F 12/0802 (2016.01)
G06Q 30/018 (2023.01)
(52) U.S. Cl.
CPC ....... G06F 12/0802 (2013.01); G06Q 30/018 (2013.01)
(58) Field of Classification Search
CPC . G06F 16/3329; G06F 40/30; G06F 16/24552
See application file for complete search history.

(56) References Cited

U.S. PATENT DOCUMENTS

2001/0001873 A1 * 5/2001 Wickeraad ............ G06F 12/121
                                                    711/E12.07
2025/0384036 A1 * 12/2025 Ganesan ........... G06F 16/24539

OTHER PUBLICATIONS

Kohler et al. "Carbon-Aware Memory Placement" ACM SIGENERGY Energy Informatics Review, vol. 4, Issue 3 pp. 39-45. Available at https://doi.org/10.1145/3698365.3698372 (Year: 2024).*

* cited by examiner

*Primary Examiner* — Jane W Benner
(74) *Attorney, Agent, or Firm* — Mannava & Kang, P.C.

(57) ABSTRACT

A computer-implemented method for cost and carbon aware large language model (LLM) cache management is disclosed. The method includes: determining whether a prompt matching an input prompt exists in a plurality of prompts stored in a cache memory; upon determining that the prompt matching the input prompt exists in the cache memory, returning a response associated with the prompt from the cache memory; otherwise, (a) invoking the LLM and returning a response generated by the LLM, (b) updating the cache memory with the input prompt and the associated response obtained from the LLM as an entry in the cache memory, (c) estimating an operational cost and a carbon cost associated with generating the response to the input prompt, (d) fetching data associated with the LLM, and (e) updating the operational cost, the carbon cost and the data associated with the LLM as metadata of the entry in the cache memory.

13 Claims, 7 Drawing Sheets

402 — Obtain Response from the LLM to the input prompt

404 — Is Cache Memory Full?

No

406 — Update the Entry in the Cache Memory

Yes

408 — Compute a Frugal Score for Each Entry in the Cache Memory

410 — Swap-out the Entry with Least Frugal Score

Table 1

| Prompt | Response | Inference Cost | Carbon Cost | H | Score | Rank |
|---|---|---|---|---|---|---|
| P1 | R1 | 5 | 0.5 | 31 | 1.0 | 1 |

Table 2

| Prompt | Response | Inference Cost | Carbon Cost | H | Score | Rank |
|---|---|---|---|---|---|---|
| P1 | R1 | 5 | 0.5 | 31 | 0.0 | 2 |
| P2 | R2 | 6 | 0.6 | 34 | 1.0 | 1 |

Table 3

| Prompt | Response | Inference Cost | Carbon Cost | H | Score | Rank |
|---|---|---|---|---|---|---|
| P1 | R1 | 5 | 0.5 | 31 | 0.50 | 2 |
| P2 | R2 | 6 | 0.6 | 34 | 0.61 | 1 |
| P3 | R3 | 2 | 0.2 | 55 | 0.41 | 3 |

Table 4

| Prompt | Response | Inference Cost | Carbon Cost | H | Score | Rank |
|---|---|---|---|---|---|---|
| P1 | R1 | 5 | 0.5 | 31 | 0.58 | 2 |
| P2 | R2 | 6 | 0.6 | 34 | 0.70 | 1 |
| P3 | R3 | 2 | 0.2 | 55 | 0.41 | 3 |
| P4 | R4 | 3 | 0.3 | 21 | 0.19 | 4 |

Figure 5A

Table 5

| Prompt | Response | Inference Cost | Carbon Cost | H | Score | Rank |
|--------|----------|----------------|-------------|-----|-------|------|
| P1 | R1 | 5 | 0.5 | 31 | 0.55 | 3 |
| P2 | R2 | 6 | 0.6 | 34 | 0.69 | 1 |
| P3 | R3 | 2 | 0.2 | 55 | 0.41 | 4 |
| P5 | R5 | 7 | 0.7 | 10 | 0.58 | 2 |

Figure 5B

SYSTEM AND METHOD FOR COST AND CARBON AWARE LARGE LANGUAGE MODEL CACHE MANAGEMENT

TECHNICAL FIELD

The present disclosure generally relates to cache management and, more particularly, to a system and a method for cost and carbon aware large language model cache management.

BACKGROUND

Large Language Models (LLMs) have gained significant traction in recent years, transforming various fields through their ability to understand and generate human-like text. Leveraging vast amounts of data, LLMs such as OpenAI's GPT series, Google's BERT, and other have been employed in applications ranging from customer support and content creation to programming assistance and language translation. The versatility of the LLMs allow businesses to automate tasks, enhance user engagement, and improve decision-making processes.

While LLMs offer substantial benefits to individuals and businesses, traditional LLMs and their associated systems encounter significant challenges related to efficiency and the costs of handling multiple API calls for similar queries. For example, when a user submits queries (prompts) that are similar, the conventional systems process each one separately, resulting in redundant Application Programming Interface (API) calls. Such redundancy not only drives up operational costs but also puts unnecessary strain on the system resources, leading to slower response times and decreased efficiency. Additionally, the lack of a systematic way to store and retrieve previously processed data (e.g., the responses and corresponding prompts) by the LLMs may make it difficult to maintain consistent performance levels and meet real-time application demands, and, thereby, limiting usability and overall reliability of the LLMs in various interactive settings.

SUMMARY

This summary is provided to introduce a selection of concepts in a simple manner that is further described in the detailed description of the disclosure. This summary is not intended to identify key or essential inventive concepts of the subject matter nor is it intended for determining the scope of the disclosure.

A system for cost and carbon aware large language model cache management is disclosed. The system includes at least one memory storing instructions, a cache memory, and at least one processor communicatively coupled with the at least one memory and the cache memory. The at least one processor is configured to execute the instructions to, receive an input prompt from a user device, determine whether a prompt matching the input prompt exists in a plurality of prompts stored in a cache memory. Upon determining that the prompt matching the input prompt exists in the cache memory, the processor returns a response associated with the prompt from the cache memory. Else, that is, upon determining that the prompt matching the input prompt is not cached in the cache memory, the processor invokes the LLM to obtain a response to the input prompt and returns the response generated by the LLM to the user device, updates the cache memory with the input prompt and the associated response obtained from the LLM as an entry in the cache memory, estimates an operational cost and a carbon cost associated with generating the response to the input prompt, fetches data associated with the LLM, and updates the operational cost, the carbon cost and the data associated with the LLM as metadata of the entry in the cache memory. Further, the processor is configured to update the cache memory by swapping out an existing entry in the cache memory upon determining that the cache memory is full.

Further disclosed is a method cost and carbon aware large language model cache management. The method includes, receiving an input prompt from a user device, and determining whether a prompt matching the input prompt exists in a plurality of prompts stored in a cache memory. Upon determining that the prompt matching the input prompt exists in the cache memory, returning a response associated with the prompt from the cache memory. Upon determining that the prompt matching the input prompt is not cached in the cache memory, the method includes, invoking the LLM to obtain a response to the input prompt and returning the response generated by the LLM to the user device, updating the cache memory with the input prompt and the associated response obtained from the LLM as an entry in the cache memory, estimating an operational cost and a carbon cost associated with generating the response to the input prompt, fetching data associated with the LLM, and updating the operational cost, the carbon cost and the data associated with the LLM as metadata of the entry in the cache memory. The method further includes swapping out an existing entry in the cache memory upon determining that the cache memory is full.

Further disclosed is method for swapping out an existing entry in the cache memory upon determining that the cache memory is full. The method includes, computing a frugal cache score for each entry among a plurality of entries stored in the cache memory, wherein the frugal cache score is computed based at least in part upon the metadata of each entry and based at least in part upon a caching policy, identifying an entry with a least frugal cache score among the plurality of entries cached in the cache memory, and swapping the entry with the least frugal cache score value in the cache memory to store a new entry and metadata of the new entry.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Various embodiments in accordance with the present disclosure will be described with reference to the drawings, in which:

FIGS. 5A and 5B depict an example of swapping out a cache entry, in accordance with an embodiment of the present disclosure.

Like reference numbers and designations in the various drawings indicate like elements.

DETAILED DESCRIPTION

Figure 1:
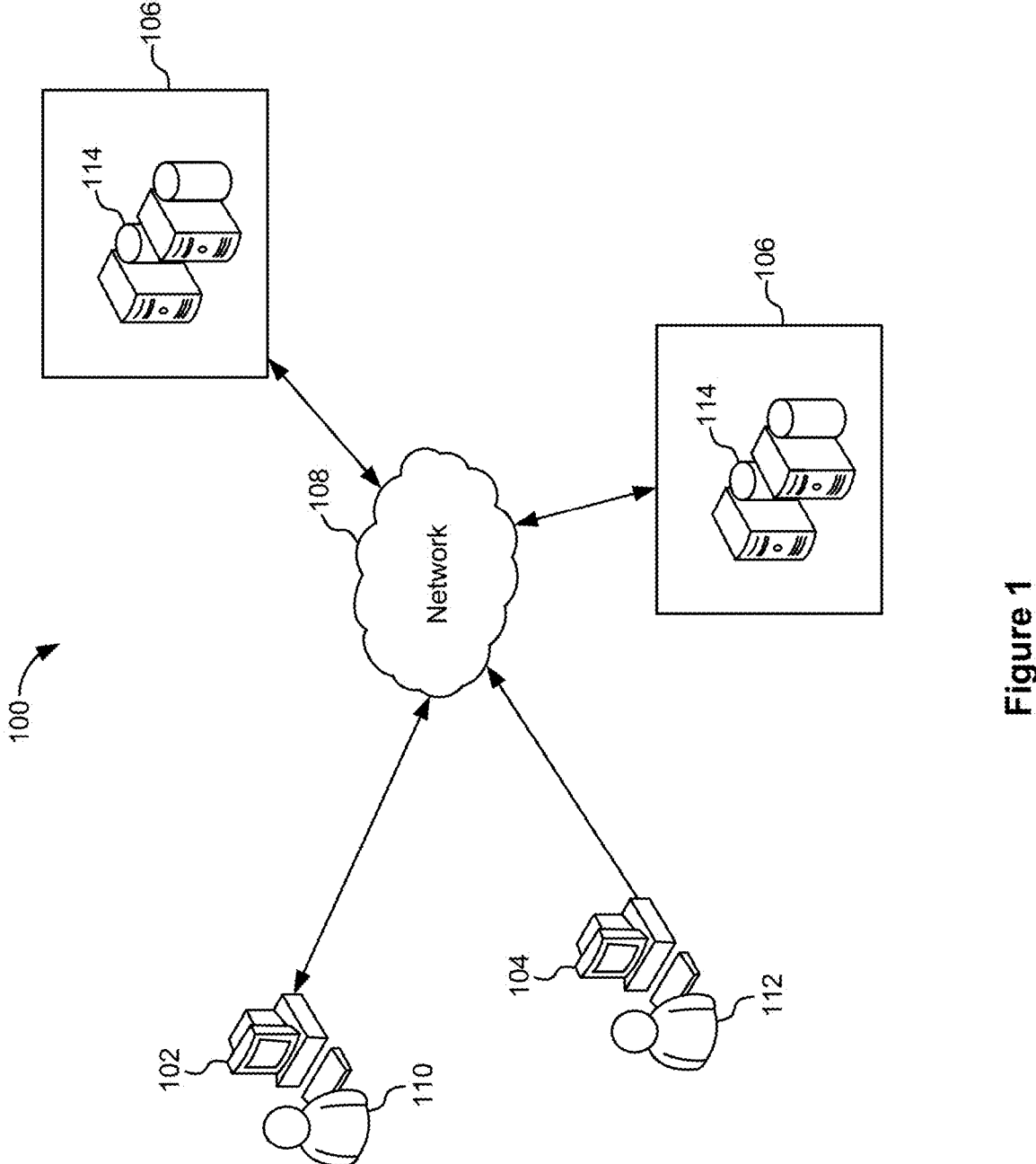
FIG. 1 depicts an example environment to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

Embodiments of the present disclosure disclose a system and a method for cost and carbon aware large language model (LLM) cache management. In an embodiment of the present disclosure, upon receiving an input prompt from a user device, the system determines whether a prompt matching the input prompt exists in a plurality of prompts stored in a cache memory. Upon determining that the prompt matching the input prompt exists in the cache memory, the system returns a response associated with the prompt from the cache memory. In contrast, upon determining that the prompt matching the input prompt does not exist in the cache memory, the system invokes the LLM to obtain a response to the input prompt and returns a response generated by the LLM to the user device. Further, the system updates the cache memory with the input prompt and the associated response obtained from the LLM as an entry in the cache memory. In one embodiment, the system is further configured to update the cache memory entries with metadata, wherein metadata includes an operational cost, and a carbon cost associated with generating the response to the input prompt and data associated with the LLM. Such metadata is further utilized by the system while swapping out an entry when the cache memory is full, that is, when replacing an entry as the cache memory reaches its full or predetermined capacity.

FIG. 1 depicts an example environment 100 to execute implementations of the present disclosure. In some examples, the example environment 100 enables cost and carbon aware LLM cache management for enhancing the performance of the LLM at least in terms of response time, operation cost, and carbon cost.

As depicted in FIG. 1, the example environment 100 includes computing devices 102 and 104, back-end systems 106, and a network 108. In some examples, the computing devices 102 and 104 are used by respective users 110 and 112 to log into and interact with computing platforms or back-end systems 106 executing applications according to implementations of the present disclosure. Examples of the computing devices 102 and 104 may include a server, a notebook, a desktop, a netbook, smartphones, laptops, a tablet, and/or voice-enabled devices. It is contemplated that implementations of the present disclosure may be realized with any appropriate type of computing device. In some examples, each of the computing devices 102 and 104 may include a web browser application executed thereon, which may be used to display one or more web pages of applications executing on the computing platform 106. In some examples, each of the computing devices 102 and 104 may display one or more Graphical User Interfaces (GUIs) that enable the respective users 110 and 112 to interact with the computing platform or back-end system 106.

In some examples, the network 108 may correspond to a communication network. Examples of the network 108 may include, but are not limited to, a Local Area Network (LAN), a Wide Area Network (WAN), the Internet, Wi-Fi, Long Term Evolution (LTE), Worldwide Interoperability for Microwave Access (WiMAX), General Packet Radio Services (GPRS), or a combination thereof. The network 108 communicatively couples or connects the computing devices 102 and 104 with the back-end systems 106. In some examples, the network 108 may be accessed over a wired and/or a wireless communication link. For example, a computing device like smartphone may utilize a cellular network to access the network 108.

In some examples, one or more of the back-end systems 106 may be implemented as an on-premises system that is operated by an enterprise or a third-party engaged in cross-platform interactions and data management. In some examples, the back-end systems 106 may be implemented as an off-premises system (for example, a cloud or an on-demand system) that is operated by an enterprise or a third-party on behalf of an enterprise. In some examples, the back-end systems 106 may be implemented in a cloud environment. For simplicity, the back-end systems 106 depicted in FIG. 1 may be a cloud environment that is intended to represent various forms of servers including a web server, an application server, a proxy server, a network server, a server pool, and/or the like.

In some examples, each of the back-end systems 106 includes one or more cache management systems 114. A cache management system 114 may host components of enterprise systems and applications. Also, the cache management system 114 accepts requests from the users 110 and/or 112 through the respective computing devices 102 and/or 104 for services being provided by the enterprise systems and the applications. The requests received from the users 110 and/or 112 through the respective computing devices 102 and/or 104 may be prompts for one or more tasks. Examples of the tasks may include question-answering, automation of process execution, process planning, generation of step-by-step procedures, and/or performing of data analysis, etc. In some implementations, the prompts may be used as a mode of interaction with a Generative Artificial Intelligence (Gen AI) system for the one or more tasks. The Gen AI system includes one or more Large Language Models (LLMs) and associated one or more caching databases. The LLM may be used for performing the tasks requested in the prompts. Results of the tasks may be temporarily stored in a caching database as responses generated by the LLM.

In response to the requests/prompts, the cache management system 114 (or the caching database associated with the LLM) receives responses from the LLM of the Gen AI system. The cache management system 114 forwards the responses to the computing devices 102 and/or 104.

According to implementations of the present disclosure, the cache management system 114 may be adapted for managing prompts and the responses generated by the LLM in the caching database, which is described in detail in conjunctions with figures below.

Figure 2:
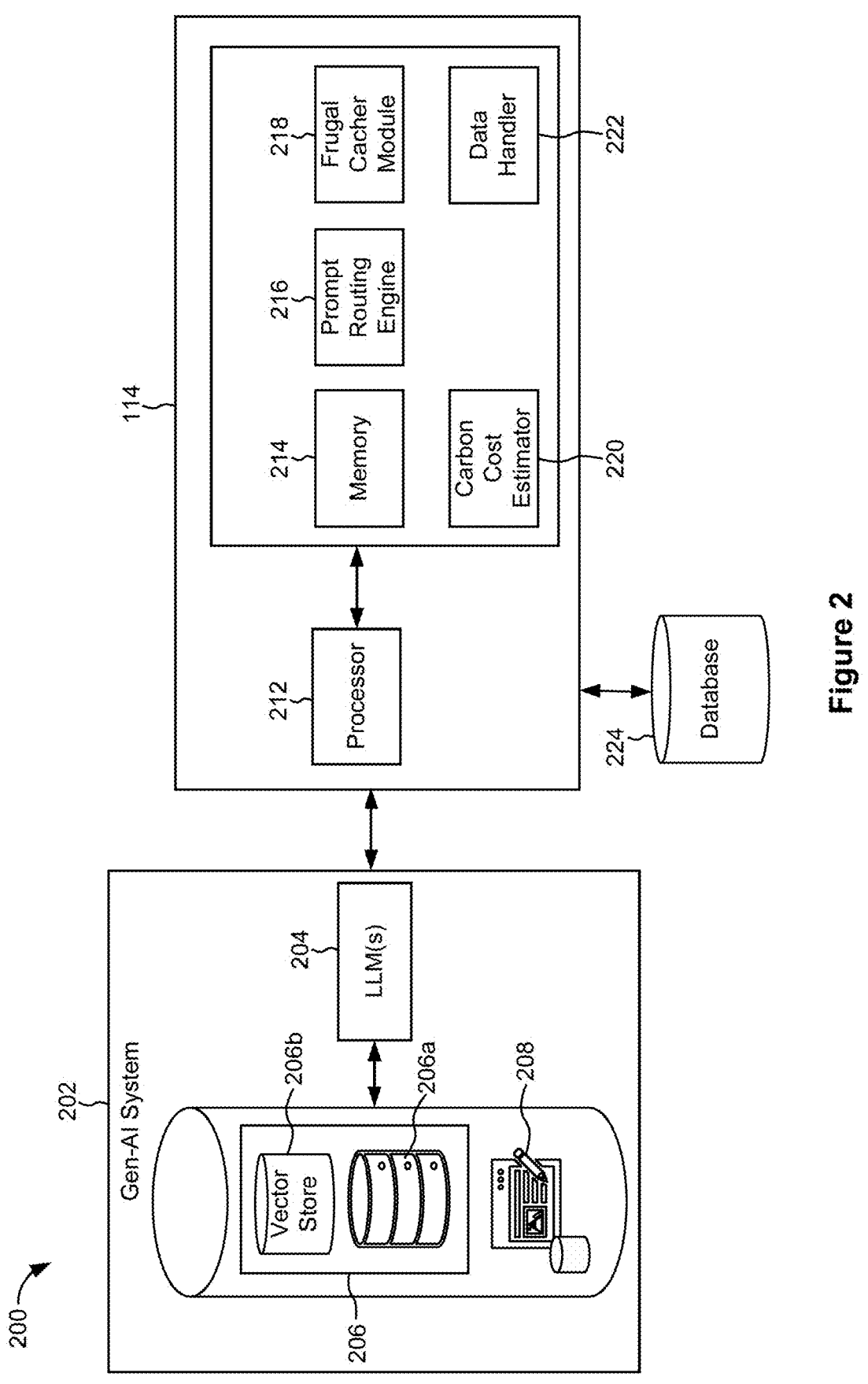
FIG. 2 depicts a block diagram of a system for cost and carbon aware LLM cache management, in accordance with an embodiment of the present disclosure.

FIG. 2 depicts a block diagram of a system for cost and carbon aware LLM cache management, in accordance with an embodiment of the present disclosure. As shown, the system 200 includes a Gen AI system 202, and a cache management system 114.

The Gen AI system 202 includes one or more LLMs 204 (also referenced herein as foundation models). In some implementations, the Gen AI system 202 includes a hosting infrastructure (not depicted in FIG. 2) to host the LLMs 204. Examples of the hosting infrastructure may include cloud computing platforms or the like. The LLMs 204 function as foundation models in the Gen AI system 202. In some examples, the LLMs 204 may be provided by one or more third parties. In some examples, the LLMs 204 may be provided by one or more enterprises, which deploy the cache management system 114. The LLMs 204 understand, generate, and process human language. The LLMs 204 are trained using deep learning techniques and based on extensive datasets including diverse sources, allowing the LLMs 3204 to learn patterns, context, and nuances in human language. The LLMs 204 perform language processing tasks including text generation, translation, summarization, question-answering, and the like. In some examples, the LLMs 204 refer to models that use deep learning techniques and have a plurality of parameters, which may range from millions to billions. Further, the LLMs 204 are accessed through an Application Programming Interface (API), which serves as a gateway for receiving requests or queries in a form of processed text prompts.

The LLM 204 receives the requests/prompts from the computing devices 102 and/or 104 through the cache management system 114 and generates the responses for the requests/prompts. The LLM 204 may generate the responses/contents based on any appropriate modality (for example, text, audio, image, video, and/or the like). In some examples, the responses may correspond to one or more of the tasks being represented by the prompts.

While implementations of the present disclosure are described in further detail herein with non-limiting reference to the LLMs 204, it is contemplated that implementations of the present disclosure may be realized using any appropriate foundation models or Machine Learning (ML) models, or Artificial Intelligence (AI) models.

The Gen AI system 202 further includes a primary database 206 and a caching database 208 (also referred to as cache memory 208). The primary database 206 may also be referenced herein as a main database or a knowledge database. The primary database 206 stores original and authoritative data (most accurate, reliable, and trusted data). Therefore, the primary database 206 serves as the central source of truth for data, from which information is retrieved, managed, and updated. The primary database 206 as the central source of truth for data includes definitive/accurate version of the data (for example, definitive version of generated responses by the LLMs 204), ensuring that any changes or updates are made in the primary database 206 first before being reflected in other systems like the caching database 208.

In some implementations, the primary database 206 may include a long-term memory 206a and/or a vector store 206b. The long-term memory 206a may store the data including the responses generated by the LLMs 204 and the associated prompts for an extended period of time. The data may be used for generation of subsequent responses by the LLMs 204. In some examples, the long-term memory 206a may be implemented utilizing additional components such as the vector store 206b. Therefore, the long-term memory 206a may store the data or embeddings that the LLMs 204 may access and use to generate the responses. In some other examples, the long-term memory 206a may be incorporated into the LLMs 204 itself. Therefore, the LLMs 204 may include the long-term memory 206a as an internal memory module.

Therefore, the primary database 206 serves as a reference for the original data or the vector embeddings. It should be noted that the term "primary database," "long-term memory," and "vector store" may be used interchangeably throughout the draft.

The caching database 208 acts as a high-speed repository for storing the data temporarily. In some implementations, the caching database 208 may be a distributed synchronized caching database. The data includes the responses generated by the LLM 204 and the associated prompts/requests received by the LLM 204 for generation of the responses. In some examples, the caching database 208 may leverage in-memory capabilities from a data structure server to provide rapid access and efficient management of the data. Therefore, the caching database 208 supports various data structures including strings, hashes, lists, sets, and sorted sets.

In some examples, the caching database 208 may be implemented as an in-memory module, or a disk-based memory, or a combination thereof. Implementation of the caching database 208 in various options may depend on access patterns of the caching database 208 and cost considerations, which further optimizes performance of the caching database 208. In an example, the caching database 208 may be implemented as the in-memory module for high-speed access to frequently requested data. In another example, the caching database 208 may be implemented as the disk-based caching option for larger datasets where cost is a concern. In yet another example, the caching database 208 may be implemented as the combination of the in-memory module and the disk-based memory to balance speed and cost-efficiency.

In some examples, the data stored in the caching database 208 may also be associated with timestamp, user/computing device identifier (ID), a unique ID, tags/labels, and/or the like. The tags/labels may indicate trends/popularity, one or more tasks, latency, and/or the like associated with the data. Further, it should be noted that the data stored in the caching database 208 may adhere to security and privacy standards. For example, if the data is sensitive, then the data is encrypted in the caching database 208 and access to the respective data may be controlled meticulously.

The data in the caching database 208 may be dynamically managed and/or updated (including storing and removing of the data) by the cache management system 114, which is described in detail below.

The cache management system 114 includes a processor 212, and a memory 214. In some implementations, the cache management system 114 includes more than one processor. The processor 212 may include, for example, microprocessors, microcomputers, microcontrollers, digital signal processors, central processing units, state machines, logic circuits, and/or any devices that manipulate data or signals based on operational instructions. The memory 214 may be a non-volatile memory or a volatile memory. Examples of the non-volatile memory may include, but are not limited to, a flash memory, a Read Only Memory (ROM), a Programmable ROM (PROM), Erasable PROM (EPROM), and Electrically EPROM (EEPROM) memory. Examples of the volatile memory may include, but are not limited to, a Dynamic Random Access Memory (DRAM), and a Static Random-Access Memory (SRAM).

The memory 214 may be communicatively coupled to the processor 212. The memory 214 stores a plurality of instructions, which upon execution by the processor 212, cause the processor 212 to perform various operations described in the present disclosure. In one embodiment of the present disclosure, cache management system 114 further includes a prompt routing engine 216, a frugal cacher module 218, a carbon cost estimator 220 and a data handler 222.

In an implementation, the cache management system 114 may have an associated database 224. The database 224 may be configured to store various data and intermediate results generated by the components 216 to 222. For example, the database 224 may be configured to store a prompt received for generating a response, a response generated corresponding to the prompt, information regarding a cache hit, a cache miss, updated values of different features like time taken to generate the response, and the like, which are described in detail below.

In one embodiment of the present disclosure, upon receiving an input prompt from a user device (for example, the computing device 102), the prompt routing engine 216 determines whether a prompt matching the input prompt exists in a plurality of prompts stored in the cache database/cache memory 208. It is important to note that the cache memory 208 may be part of the GenAI system 202 or the cache management system 114, such as the database 224. The plurality of prompts may include historical prompts received from the user device 102 or any other user device, for example the computing device 104. Upon determining that the prompt matching the input prompt exists in the cache memory 208, the prompt routing engine 216 routes the input prompt to the cache memory 208, fetches the response associated with the matched prompt and returns the response to the user device 102. In contrast, upon determining that the prompt matching the input prompt is not cached in the cache memory 208, the prompt routing engine 216 routes the input prompt to the LLM 204 to obtain a response to the input prompt and returns the response generated by the LLM 204 to the user device 102. Further, the data handler 222 updates the cache memory with the input prompt and the associated response obtained from the LLM 204 as an entry in the cache memory. Furthermore, in one embodiment of the present disclosure, the frugal cacher module 218 and carbon cost estimator 220 estimates an operational cost and a carbon cost associated with generating the response to the input prompt, fetches data associated with the LLM 204 and then the data handler 222 stores or updates the operational cost, the carbon cost and the data associated with the LLM as metadata of the entry in the cache memory. The manner in which the above operations are performed is explained in detail in the present disclosure.

Figure 3:
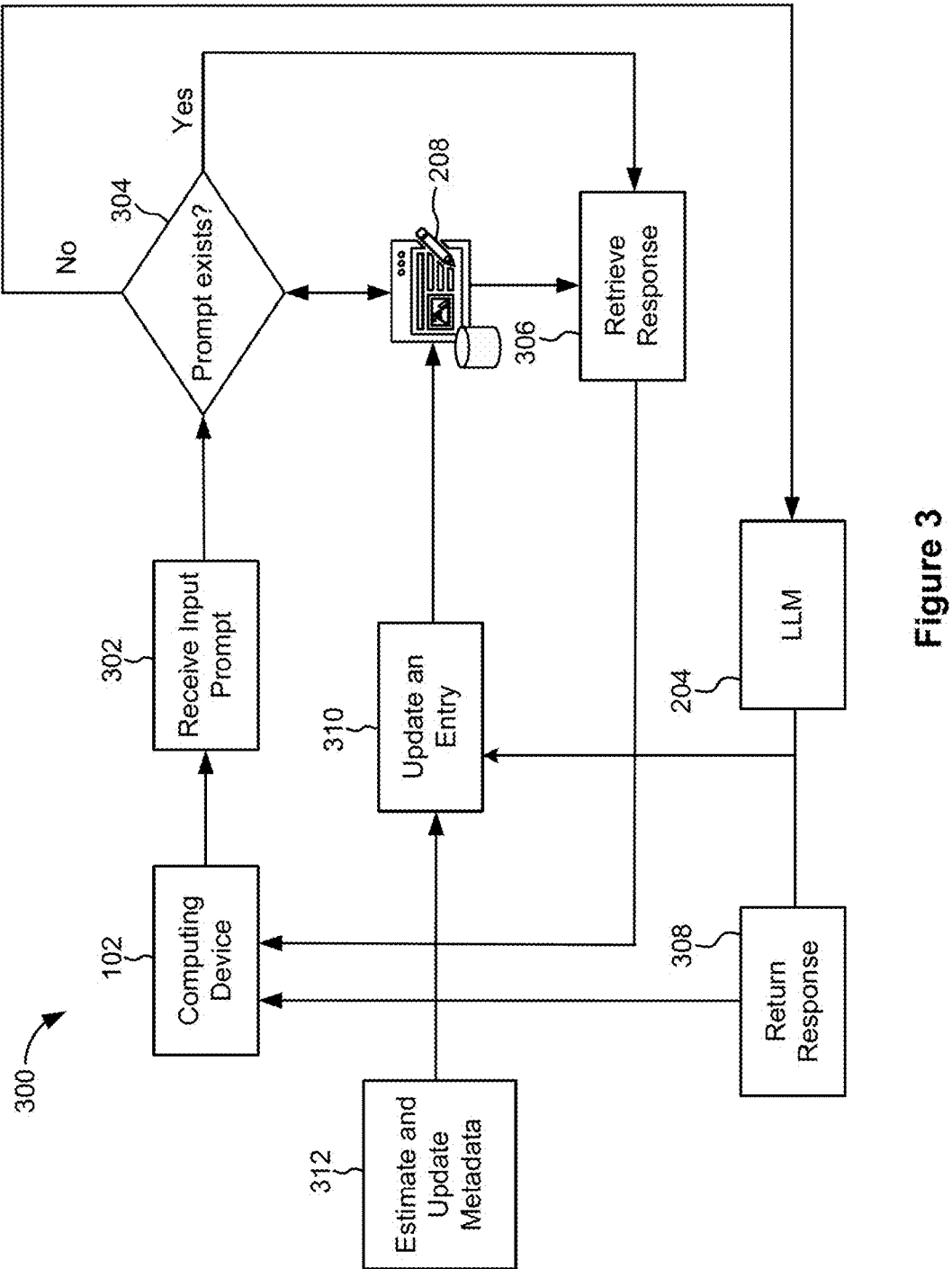
FIG. 3 is a flow diagram depicting cache management, in accordance with an embodiment of the present disclosure.

FIG. 3 is a flow diagram depicting cache management, in accordance with an embodiment of the present disclosure. FIG. 3 is explained in conjunction with FIGS. 1 and 2.

As shown, the cache management system 114 receives an input prompt (query/input) 302 from the computing device 102. The input prompt 302 may include a request for performing one or more tasks. The tasks may include, but are not limited to, question and answering (Q&A), summarization, sentiment analysis, and/or information retrieval.

Upon receiving the input prompt 302, as shown at step 304 in FIG. 3, the prompt routing engine 216 determines whether a prompt matching the input prompt 302 exists in the plurality of prompts stored in the cache memory 208. In one implementation, the prompt routing engine 216 compares the texts of the input prompt 302 with texts of one or more of the plurality of prompts to identify the prompt matching the input prompt 302. This may involve natural language processing techniques to analyze the text and find similarities based on keywords, context, or overall meaning.

In another implementation, the prompt routing engine 216 performs semantic similarity analyses between the input prompt 302 and the one or more of the plurality of prompts to identify the prompt matching the input prompt 302. That is, the prompt routing engine 216 transforms the input prompt 302 into input vector embeddings. The input vector embeddings capture semantic meaning and context of the input prompt 302. For example, prompt routing engine 216 may use embedding techniques such as a Word to Vector (Word2Vec), a Global Vectors for Word Representation (Glove), or the like, for transforming the input prompt 302 into the input vector embeddings. Upon transformation, the prompt routing engine 216 queries the cache memory 208 and receives vector embeddings that matches the input vector embeddings. The vector embeddings may be received from the cache memory 208 based on similarity scores computed between the vector embeddings and the input vector embeddings using, for example, cosine similarity method.

Upon determining that the prompt matching the input prompt 302 exists in the cache memory 208, the prompt routing engine 216 routes the input prompt 302 to the cache memory 208 and retrieves, through the data handler 222, the response from the caching database 208 for the received input prompt 302 as shown at step 306. The retrieved response is returned to the computing device 102 associated with the user as shown.

In one embodiment, upon determining that the prompt matching the input prompt 302 is not cached in the cache memory 208, the prompt routing engine 216 routes the input prompt 302 to the LLM 204 to obtain a response to the input prompt 302. The response generated by the LLM 204 is returned to the computing device 102 as shown at step 308. That is, the prompt routing engine 216 transforms the input prompt 302 into input vector embeddings and queries the LLM 204 through the data handler 222 to obtain the response to the input prompt 302 and returns the obtained response to the computing device 102.

In one embodiment of the present disclosure, upon obtaining the new response to the input prompt 302 from the LLM 204, the data handler 222 updates the cache memory 208 with the input prompt 302 and the associated response obtained from the LLM 204 as an entry in the cache memory 208, as shown at step 310. Hence, the cache memory 208 serves as a temporary storage that holds pairs of input prompt and corresponding response generated by the LLM 204.

In one embodiment of the present disclosure, upon obtaining the response from the LLM 204, the frugal cacher module 218 estimates an operational cost (I) associated with generating the response to the input prompt 302, the carbon cost estimator 220 estimates a carbon cost (C) associated with generating the response to the input prompt 302, and the data handler 222 fetches the data (L) associated with the LLM 204. Further, the estimated operational cost (I), the carbon cost (C) and the data associated with the LLM 204 (L) is updated as metadata of the entry in the cache memory 208 as shown at step 312.

As described, the frugal cacher module 218 estimates an operational cost (I) associated with generating the response to the input prompt 302. In one embodiment, the operational cost (I) in generating the response is computed based upon time taken for generating the response and a cost per second for an instance of computing resources generating the response. In one implementation, the frugal cacher module 218 estimates the operational cost (I) as shown below.

$$\text{Operational Cost } (I) = (\text{Time Taken for Inference} \times \text{Cost of Instance per Second}) \qquad \text{Eq. (1)}$$

The time taken for inference refers to the time taken by the LLM 204 to process the input prompt 302 and generate a response, wherein the time may vary based on factors such as complexity of the input prompt 302, architecture of the LLM 204, system load and resource availability. Further, the cost of instance per second is obtained from the LLM service provider and depends on the cloud service provider, specific instance type being used (CPU instances, memory size, etc.), and pricing model.

Further, the carbon cost estimator 220 estimates the carbon cost (C) associated with generating the response to the input prompt 302 as shown below using Eq. (2).

$$\text{Carbon Cost } (C) = E \times C^I \qquad \text{Eq. (2)}$$

In Eq. (2), E is total energy consumption (in kWh) of inference and $C^I$ is carbon intensity of electricity (in $kgCO_2e/kWh$)—the amount of $CO_2$ equivalents ($CO_2e$) emitted from producing one of said unit of electricity.

Considering LLM inference is the only workload in the server—

$$E = P \times T \times N \qquad \text{Eq (3)}$$

In Eq. (3), P is the server power consumption (in Watts), T is token latency (in seconds), which refers to the time taken by the LLM to process a single token during inference, and N is the number of tokens processed during inference.

For example, if CPU is used for inference, then the CPU and memory subsystem are the two components contributing to server power consumption. Hence, $$P = P_{cpu} + P_{mem} \times M \qquad \text{Eq. (4)}$$

In Eq. (4), $P_{cpu}$ is the CPU power consumption (with TDP being a reasonable approximation), $P_{mem}$ is the power consumption per unit of memory (in Watts/GB), and M is memory usage (in GB).

As described, the operational cost (I) is computed using the equation (1) and the carbon cost (C) is computed using the Eqs. (2-4). Further the data associated with the LLM 204 (L) is fetched from the LLM 204, wherein the data associated with the LLM 204 includes top-level hyperparameter sizes, for example, Llama 7B vs. Llama 70B. Then the operational cost (I), the carbon cost (C), and data (L) associated with the LLM is updated as the metadata of the entry in the cache memory 208. It is to be noted that the metadata is computed and updated periodically, for example every few hours, daily, weekly or on-demand.

As described, on receiving the input prompt 302 from a user device (for example, the computing device 102), the cache management system 114 determines if a prompt matching the input prompt 302 exists in the cache memory 208. Upon determining that a matching prompt exists, the cache management system 114 fetches the associated response from the cache memory 208 and returns the response to the user device 102. In contrast, if a matching prompt does not exist in the caches memory 208, the cache management system 114 queries the LLM 204 to obtain a response and returns the response to the user device 102. Further, the cache management system 114 stores the input prompt 302 and the generated response as an entry in the cache memory 208. Furthermore, the cache management system 114 fetches the data (L) associated with the LLM, estimates the operational cost (I) and the carbon cost (C) associated with generating the response, and updates as the metadata of the entry in the cache memory 208.

In one embodiment, the cache management system 114 is configured to swap-out an entry in the cache memory 208 when the cache memory in full. In one embodiment, the cache management system 114 utilizes the metadata while swapping out an entry when the cache memory 208 is full, that is, when replacing an entry as the cache memory 208 reaches capacity.

Figure 4:
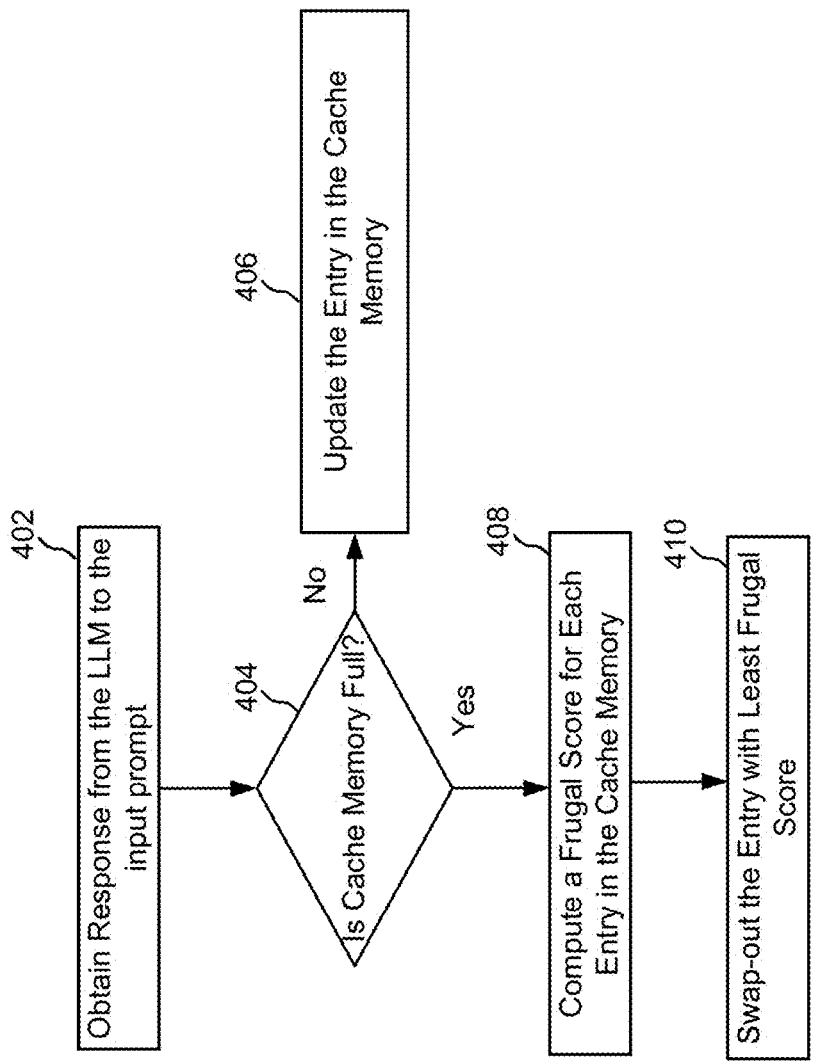
FIG. 4 depicts a flowchart illustrating a method of swapping-out a cache entry, in accordance with an embodiment of the present disclosure.

FIG. 4 depicts a flowchart illustrating a method of swapping-out or replacing a cache entry, in accordance with an embodiment of the present disclosure. As described herein, if a prompt matching the input prompt 302 is not found in the cache memory 208, the cache management system 114 redirects the input prompt to the LLM 204 and obtains a response to the input prompt 302 as shown at step 402.

Upon obtaining the response to the input prompt, the frugal cacher module 218 determines if the cache memory 208 is full, as shown at step 404. If the cache memory 208 is not full, then the frugal cacher module 218 stores the input prompt 302 and the response generated from the input prompt in the cache memory 208 using the data handler 222 along with the metadata, as shown at step 406.

In one embodiment, upon determining that the cache memory 208 is full, the frugal cacher module 218 computes a frugal score (or a frugal cache score) for each entry among a plurality of entries stored in the cache memory 208, as shown at step 408. In one embodiment, the frugal cache score is computed based at least in part upon the metadata of each entry and based at least in part upon a caching policy.

For example, for each entry e; in the cache memory 208, the frugal cacher module 218 computes a frugal cache score based on the default caching policy and the metadata of the cache entry, wherein the metadata includes the operational cost (I) and the carbon cost (C), and the data (L) associated with the LLM 204. The default caching policy (H) as described herein may include, but are not limited to, number of hits, least recently used entry, most recently used entry, frequently used, and/or least frequently used. In one embodiment, a frugal scoring function $f_{fc}$ is defined to compute the frugal score for a given entry, wherein the input to the scoring function is the default caching policy (H), the operational cost (I) and the carbon cost (C).

$$\text{Score}(e_i)=f_{fc}(H,E,I,C) \qquad \text{Eq. (5)}$$

In one implementation, function ffc is configured to linearly vary with H, and super-linearly with total energy consumption (E), the operational cost (I) and the carbon cost (C).

Upon computing the frugal cache score for each entry among the plurality of entries stored in the cache memory 208, the frugal cacher module 218 identifies an entry with a least frugal cache score among the plurality of entries cached in the cache memory 208. In one implementation, the entries are ranked based on the frugal cache score and the ranking of each entry is stored in the cache memory 208. Then the frugal cacher module 218 swaps out the entry with the least frugal cache score, (the lowest ranked entry) in the cache memory to store the new entry and metadata of the new entry, as shown at step 410. The new entry as described herein refers to the input prompt for which matching prompt does not exist in the cache memory 208 and the response obtained for the input prompt 302. In one embodiment of the present disclosure, a multi-criteria decision analysis, such as Technique for Order of Preference by Similarity to Ideal Solution (TOPSIS) is used for computing a score for each entry in the cache memory 208. In this method, an equal weightage is assigned to the operational cost (I), the carbon cost (C), and the caching policy (H). However, any other methods may be used for computing the frugal cache score for each entry in the cache memory 208.

In the disclosed method, the frugal cache score is computed when the cache memory is full (or at a predetermined capacity) and while swapping out or replacing an entry in the cache memory 208. However, the method may be implemented to compute the frugal cache score while updating an entry in the database. That is, when a new entry is made in the cache memory 208, the frugal score may be computed for all the entries in the cache memory 208 and ranks are assigned for the entries.

In one embodiment of the present disclosure, frugal cacher module 218 is further configured to determine whether the response associated with the prompt for an entry of cached entries in the cache memory has been rejected by a threshold number of times. If it is determined that the response is rejected by a threshold number of times, then the frugal cacher module 218 deletes the response and associated prompt from the cache memory 208 along with associated metadata of the entry of cached entries.

FIGS. 5A and 5B depict an example of swapping out a cache entry, in accordance with an embodiment of the present disclosure. Referring to FIG. 5A, Tables 1 to 4 illustrates cache entries in the cache memory 208, wherein each row lists the prompt, and each column stores metadata associated with the prompt. The metadata may include, but are not limited to, response for the prompt, the operational cost (I), the carbon cost (C), the caching policy (H), for example the number of hits, the frugal cache score, and the rank based on the frugal cache score. Referring to Table 1, initially a single prompt (P1) is stored in the cache memory 208 along with the metadata as an entry. The subsequent prompts (P2, P3 and P4) are stored in the cache memory 208 as and when they are received from the user device. Further, the total energy consumption (E), the operational cost (I) and the carbon cost (C) associated with each prompt is computed and then the frugal cache scores are computed and ranked as explained in the present disclosure and stored as shown in FIG. 5A. In the example shown in FIG. 5A, the frugal cache scores are computed using TOPSIS technique considering equal weightage for the operational cost (I) the carbon cost and caching policy (H). Considering that the cache memory 208 is full and the cache management system 114 receives a new input prompt from the user device 102, then the cache management system 114 retrieves the response from the LLM, determines the metadata associated with the new input prompt, and computes the frugal cache score. Then the cache management system 114 identifies the prompt, stored in the cache memory 208, having the lowest frugal cache score (hence lower rank), compares the frugal cache score the identified prompt with the frugal cache score of the new prompt and replaces the identified prompt with the new prompt if the frugal score of the identified prompt is less than the frugal cache score of the new prompt.

Referring to Table 4, the prompt (P4) has a lower frugal cache score of 0.19 in comparison to the frugal cache scores of the prompts (P1, P2 and P3). When the cache management system 114 a new prompt (P5) having the frugal cache score of 0.58, the system replaces the prompt (P4) with the new prompt (P5) as shown in Table 5 of FIG. 5B and the prompts are re-ranked based on the frugal cache scores.

As described, the embodiments of the present disclosure disclose a cost and carbon aware large language model cache management system and method. The method includes, receiving an input prompt from a user device, and determining whether a prompt matching the input prompt exists in a plurality of prompts stored in a cache memory. Upon determining that the prompt matching the input prompt exists in the cache memory, the system returns a response associated with the prompt from the cache memory. Upon determining that the prompt matching the input prompt is not cached in the cache memory, the system invokes the LLM to obtain a response to the input prompt and returns the response generated by the LLM to the user device, updates the cache memory with the input prompt and the associated response obtained from the LLM as an entry in the cache memory. The system further estimates an operational cost, and a carbon cost associated with generating the response to the input prompt, fetches data associated with the LLM, and updates the operational cost, the carbon cost and the data associated with the LLM as metadata of the entry in the cache memory. When the system receives a new prompt and if the cache memory is full, then the system computes the frugal cache score for each entry among a plurality of entries stored in the cache memory, identifying an entry with a least frugal cache score among the plurality of entries cached in the cache memory, and replaces the entry with the least frugal cache score value in the cache memory with the new entry and metadata of the new entry.

Hence, the system and method disclosed in the present disclosure provides a caching mechanism that enhances standard caching by adding the ability to jointly optimize cost and carbon emission. Further, the system and the method help in reducing the carbon emission and the cost associated with the usage of LLMs for applications, while remaining as close as possible to the standard caching policy.

Figure 6:
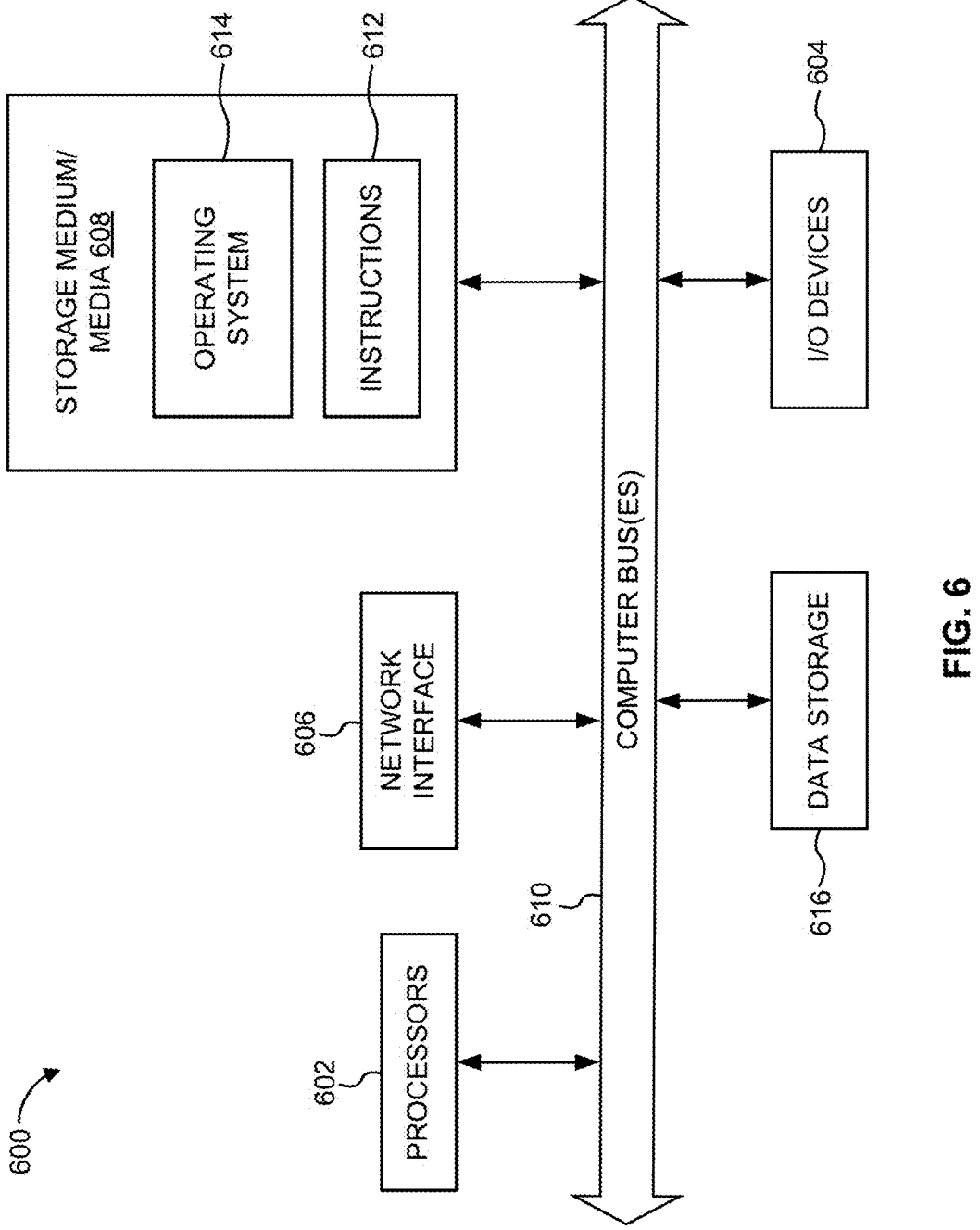
FIG. 6 illustrates an example computer system used to implement the cache management system.

FIG. 6 illustrates an example computer system used to implement the cache management system. More particularly, computing machines such as desktops, laptops, smartphones, tablets, and/or wearable electronic devices which may be used for adaptive caching of responses generated by the LLM 204 and may have the structure of the computer system 600. The computer system 600 may include additional components not shown and that some of the process components described may be removed and/or modified. In another example, a computer system 600 may be deployed on external-cloud platforms such as cloud, internal corporate cloud computing clusters, organizational computing resources, and/or the like.

The computer system 600 includes processor(s) 602, such as a central processing unit, a controller, an application specific integrated circuit (ASIC), or another type of processing circuit, input/output devices (I/O) 604, such as a display, a mouse, a keyboard, etc., a network interface 606, such as a Local Area Network (LAN) interface, a wireless 802.11x interface, a 3G, 4G, 5G, or 6G mobile WAN or a WiMax WAN, and a computer-readable medium 608. Each of these components may be operatively coupled each other via one or more computer bus(es) 610. The computer-readable medium 608 may be any suitable medium that participates in providing instructions to the processor(s) 602 for execution. For example, the computer-readable medium 608 may be non-transitory or non-volatile medium, such as a magnetic disk or solid-state non-volatile memory or volatile medium such as RAM. The instructions or modules stored on the computer-readable medium 608 may include machine-readable or machine-executable instructions or code 612 executed by the processor(s) 602 that cause the processor(s) 602 to perform the methods and functions of the cache management system 114.

The cache management system 114 may be implemented as software stored on a non-transitory computer-readable medium and executed by the processors 602. For example, the computer-readable medium 608 may store an operating system 614, such as MAC OS, MS WINDOWS, UNIX, or LINUX, and code 612 for the cache management system 114. The operating system 614 may be multi-user, multi-processing, multitasking, multithreading, real-time, and the like. For example, during runtime, the operating system 614 and the code for the cache management system 114 are executed by the processor(s) 602.

The computer system 600 may include a data storage 616, which may include non-volatile data storage. The data storage 616 stores any data used or generated by the cache management system 114.

The network interface 606 connects the computer system 600 to external systems for example, via a LAN. Also, the network interface 606 may connect the computer system 600 to the Internet. For example, the computer system 600 may connect to web browsers and other external applications and systems via the network interface 606.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in a generic classical processor system and a quantum computing system.

FIG. 4 illustrates a schematic diagram of an exemplary generic processor system. The system 400 can be used for the operations described in this specification according to some implementations. The system 400 is intended to represent various forms of digital computers, workstations, servers, blade servers, mainframes, and other appropriate computers. The components shown, their connections and relationships, and their functions, are exemplary only, and do not limit implementations of the inventions described and/or claimed in this document. The system 400 includes a processor 410, a memory 420, a storage device 430, and an input/output device 440. Each of the components 410, 420, 430, and 420 are interconnected using a system bus 450. The processor 410 may be enabled for processing instructions for execution within the system 400. In one implementation, the processor 410 is a single-threaded processor. In another implementation, the processor 410 is a multi-threaded processor. The processor 410 may be enabled for processing instructions stored in the memory 420 or on the storage device 430 to display graphical information for a user interface on the input/output device 440. In one implementation, the memory 420 is a computer-readable medium. In one implementation, the memory 420 is a volatile memory unit. In another implementation, the memory 420 is a non-volatile memory unit. The storage device 430 may be enabled for providing mass storage for the system 400. In one implementation, the storage device 430 is a computer-readable medium. In various different implementations, the storage device 430 may be a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for cost and carbon aware large language model (LLM) cache management, the computer-implemented method comprising:
    receiving, by at least one processor, an input prompt from a user device;
    determining, by the at least one processor, whether a prompt matching the input prompt exists in a plurality of prompts stored in a cache memory; and
    upon determining that the prompt matching the input prompt exists in the cache memory,
        returning, by the at least one processor, a response associated with the prompt from the cache memory;
    upon determining that the prompt matching the input prompt is not cached in the cache memory,
        invoking, by the at least one processor, the LLM to obtain a response to the input prompt and returning the response generated by the LLM to the user device;
        updating, by the at least one processor, the cache memory with the input prompt and the response obtained from the LLM as an entry in the cache memory;
        estimating, by the at least one processor, an operational cost and a carbon cost associated with generating the response to the input prompt,
            wherein the operational cost in generating the response is computed based upon time taken for generating the response and a cost per second for an instance of computing resources generating the response;
        fetching, by the least one processor, data associated with the LLM; and
        updating, by the at least one processor, the operational cost, the carbon cost and the data associated with the LLM as metadata of the entry in the cache memory.

2. The computer-implemented method of claim 1, updating the cache memory further comprises swapping out an existing entry in the cache memory upon determining that the cache memory is full.

3. The computer-implemented method of claim 2, wherein swapping out an existing entry in the cache memory upon determining that the cache memory is full comprises:
    computing a frugal cache score for each entry among a plurality of entries stored in the cache memory, wherein the frugal cache score is computed based at least in part upon the metadata of each entry and based at least in part upon a caching policy;
    identifying an entry with a least frugal cache score among the plurality of entries cached in the cache memory; and
    swapping the entry with the least frugal cache score value in the cache memory to store a new entry and metadata of the new entry.

4. The computer-implemented method of claim 1, wherein determining the prompt matching the input prompt exists in the plurality of prompts stored in the cache comprises one or more of:
    comparing texts of the input prompt with texts of one or more of the plurality of prompts to identify the prompt matching the input prompt; and
    performing semantic similarity analyses between the input prompt and the one or more of the plurality of prompts to identify the prompt matching the input prompt.

5. The computer-implemented method of claim 1, wherein the data associated with the LLM comprises top-level hyperparameter sizes.

6. The computer-implemented method of claim 1, further comprising:
    determining, by the at least one processor, whether the response associated with the prompt for an entry of cached entries in the cache memory has been rejected by a threshold number of times; and
    deleting, by the at least one processor, from the cache memory, the response and associated prompt along with associated metadata of the entry of cached entries.

7. A system for cost and carbon aware large language model (LLM) cache management, the system comprising:
    at least one memory storing instructions;
    a cache memory; and
    at least one processor communicatively coupled with the at least one memory and the cache memory, wherein the at least one processor is configured to execute the instructions to:
        receive an input prompt from a user device;
        determine whether a prompt matching the input prompt exists in a plurality of prompts stored in a cache memory; and
        upon determining that the prompt matching the input prompt exists in the cache memory,
            return a response associated with the prompt from the cache memory;
    upon determining that the prompt matching the input prompt is not cached in the cache memory, invoke the LLM to obtain a response to the input prompt and returning the response generated by the LLM to the user device;

update the cache memory with the input prompt and the response obtained from the LLM as an entry in the cache memory;

estimate an operational cost and a carbon cost associated with generating the response to the input prompt, wherein the operational cost in generating the response is computed based upon time taken for generating the response and a cost per second for an instance of computing resources generating the response;

fetch data associated with the LLM; and update the operational cost, the carbon cost and the data associated with the LLM as metadata of the entry in the cache memory.

8. The system of claim 7, wherein the at least one processor is further configured to update the cache memory by swapping out an existing entry in the cache memory upon determining that the cache memory is full.

9. The system of claim 8, wherein swapping out an existing entry in the cache memory upon determining that the cache memory is full comprises:

computing a frugal cache score for each entry among a plurality of entries stored in the cache memory, wherein the frugal cache score is computed based at least in part upon the metadata of each entry and based at least in part upon a caching policy;

identifying an entry with a least frugal cache score among the plurality of entries cached in the cache memory; and swapping the entry with the least frugal cache score value in the cache memory to store a new entry and metadata of the new entry.

10. The system of claim 7, wherein to determine the prompt matching the input prompt exists in the plurality of prompts stored in the cache, the processor is configured to perform one or more of:

comparing texts of the input prompt with texts of one or more of the plurality of prompts to identify the prompt matching the input prompt; and performing semantic similarity analyses between the input prompt and the one or more of the plurality of prompts to identify the prompt matching the input prompt.

11. The system of claim 7, wherein the data associated with the LLM comprises top-level hyperparameter sizes.

12. The system of claim 7, wherein the processor is further configured to:

determine whether the response associated with the prompt for an entry of cached entries in the cache memory has been rejected by a threshold number of times; and delete, from the cache memory, the response and associated prompt along with associated metadata of the entry of cached entries.

13. A non-transitory computer-readable media (CRM) comprising instructions stored thereon, which, when executed by at least one processor of a computing device configured for cost and carbon aware large language model (LLM) cache management, cause the computing device to:

receive an input prompt from a user device;

determine whether a prompt matching the input prompt exists in a plurality of prompts stored in a cache memory; and upon determining that the prompt matching the input prompt exists in the cache memory, return a response associated with the prompt from the cache memory;

upon determining that the prompt matching the input prompt is not cached in the cache memory, invoke the LLM to obtain a response to the input prompt and returning the response generated by the LLM to the user device;

update the cache memory with the input prompt and the response obtained from the LLM as an entry in the cache memory;

estimate an operational cost and a carbon cost associated with generating the response to the input prompt, wherein the operational cost in generating the response is computed based upon time taken for generating the response and a cost per second for an instance of computing resources generating the response;

fetch data associated with the LLM; and update the operational cost, the carbon cost and the data associated with the LLM as metadata of the entry in the cache memory.

* * * * *